United States Patent
Erlichman (10) Patent No.: US 6,790,138 B1
(45) Date of Patent: Sep. 14, 2004

(54) SYSTEM AND METHOD FOR PROVIDING AND SCORING AN INTERACTIVE PUZZLE

(76) Inventor: Martin Erlichman, 12333 Gorham Ave., Los Angeles, CA (US) 90049

( * ) Notice: Subject to any disclaimer, the term of this patent is extended or adjusted under 35 U.S.C. 154(b) by 351 days.

(21) Appl. No.: 09/569,476

(22) Filed: May 12, 2000

(51) Int. Cl.[7] .............................. A63F 9/08; G09B 7/00; G06F 17/00
(52) U.S. Cl. ...................... 463/9; 273/153 R; 273/429; 700/92; 434/322
(58) Field of Search ........................ 463/1, 9, 29, 243; 700/91, 92; 705/14; 273/153 R, 429, 430, 459–461; 434/322, 347

(56) References Cited

U.S. PATENT DOCUMENTS

| | | | |
|---|---|---|---|
| 5,779,549 A | * 7/1998 | Walker et al. | 463/42 |
| 5,794,210 A | 8/1998 | Goldhaber et al. | |
| 5,855,008 A | 12/1998 | Goldhaber et al. | |
| 5,860,653 A | * 1/1999 | Jacobs | 273/272 |
| 5,916,024 A | * 6/1999 | Von Kohorn | 463/40 |
| 5,921,864 A | * 7/1999 | Walker et al. | 463/9 |
| 5,933,811 A | * 8/1999 | Angles et al. | 705/14 |
| 5,946,664 A | * 8/1999 | Ebisawa | 705/14 |
| 5,983,196 A | * 11/1999 | Wendkos | 705/14 |
| 6,015,344 A | * 1/2000 | Kelly et al. | 463/16 |
| 6,036,601 A | * 3/2000 | Heckel | 463/42 |
| 6,049,779 A | * 4/2000 | Berkson | 705/14 |
| 6,061,660 A | * 5/2000 | Eggleston et al. | 705/14 |
| 6,075,971 A | * 6/2000 | Williams et al. | 455/5.1 |
| 6,178,407 B1 | * 1/2001 | Lotvin et al. | 705/14 |
| 6,178,408 B1 | * 1/2001 | Copple et al. | 705/14 |
| 6,205,432 B1 | * 3/2001 | Gabbard et al. | 705/14 |

* cited by examiner

*Primary Examiner*—Teresa Walberg
*Assistant Examiner*—Scott E. Jones
(74) *Attorney, Agent, or Firm*—Innovative Partners; Charles E. Gotlieb (57) ABSTRACT

A system and method provides an interactive puzzle to a user and scores the attempted solutions to the puzzle. Portions of a representation of a puzzle object are successively provided to a user over time and a user is allowed to attempt to solve the puzzle by guessing the puzzle object. If the attempt succeeds, a score is provided that is higher the faster the solution is reached. If the attempt fails, the user may make other attempts until a short time after the entire puzzle has been provided, at which time a minimum score is assigned. Another puzzle is provided after a different puzzle is scored. Points for a user are cumulated and may be redeemed for cash, discounts or other prizes, either upon request or automatically on or near a predetermined date.

33 Claims, 7 Drawing Sheets

FIG. 6 ions or data or both. Storage 164, such as a computer

SYSTEM AND METHOD FOR PROVIDING AND SCORING AN INTERACTIVE PUZZLE

FIELD OF THE INVENTION

The present invention is related to computer software and more specifically to computer software for providing and scoring puzzles provided using the Internet.

BACKGROUND OF THE INVENTION

Much of the content on the Internet is not effective. Entire web pages are not visited often enough to create loyalty. Banner or button ads are displayed on web pages, but only noticed by a small fraction of users who view the web pages. Even fewer users click through the advertisements to obtain additional information or view the site each banner or button is advertising.

Content may be ineffective for a variety of reasons. Web pages may not be sufficiently entertaining to a user to cause the user to request them. Banner or button advertisements may not draw the user's attention without techniques such as flashing, which are offensive to users and distracting to users of the web page on which the banner or button is displayed. Even if an advertisement is noticed, because the advertisement is so small, the text that fits in the advertisement may not provide sufficient motivation to click through the advertisement to the web site the advertisement is promoting, even though the user would benefit from clicking through the advertisement. Without the click through, a user may not ever remember the site the advertisement is promoting.

What is needed is a system and method that can draw a user to a website, notice a banner advertisement and promote click throughs of a banner advertisement.

SUMMARY OF INVENTION

A system and method displays a puzzle, for example, on a website, near a link or banner advertisement or as part of an advertisement. The puzzle may consist of portions, and successive portions are added to a display or otherwise provided over a period of time and the user is allowed to guess the subject of the puzzle during or after the time the portions are being added to the display or otherwise provided. Points are awarded for correct guesses according to the speed of the guess: the points awarded for a correct guess decrease as more portions of the puzzle are provided. The point value of solving the puzzle is enhanced if the user clicks through an advertisement on the web page. A user may redeem for prizes or discounts the points accumulated by solving the puzzle and other puzzles.

Users will be drawn to a website that allows the user to solve puzzles, so new users will see the site and former users will return to play the game. If the game is near or is part of a banner, link or button advertisement, users are more likely to view the advertisement. Because users can receive rewards for clicking though the link or advertisement, users are more likely to click through the link or advertisement. In this manner, the web page, link or advertisement is made more effective.

DETAILED DESCRIPTION OF A PREFERRED EMBODIMENT

Figure 1:
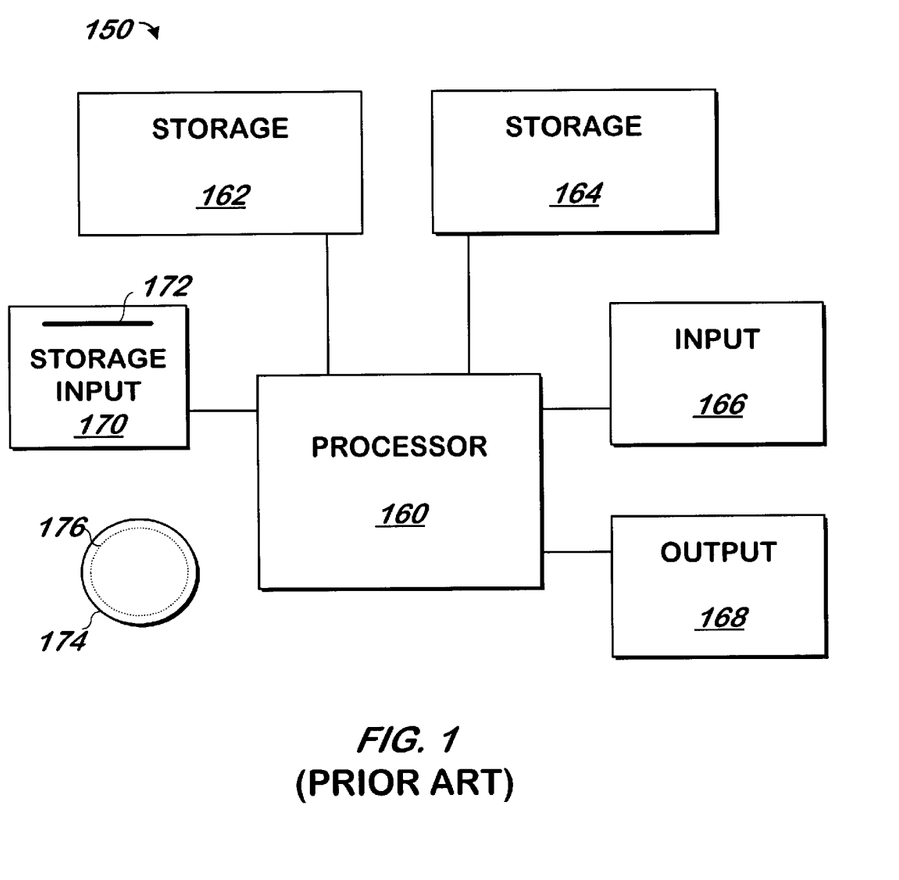
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructdisk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150, although other input techniques such as voice input may be used. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Pentium-compatible computer system running one or more of the Windows 95/98/NT operating systems commercially available from Microsoft Corporation of Redmond, Wash., a PowerPC computer system running the MacOS commercially available from Apple Computer Corporation of Cupertino, Calif., or an Ultra Sparc workstation running the Solaris operating system commercially available from Sun Microsystems of Palo Alto, Calif., although other systems may be used. Other operating systems such as Linux may be used, and other platforms, such as the WebTV platform commercially available from Microsoft Corporation of Redmond, Wash., may also be used.

Figure 2A:
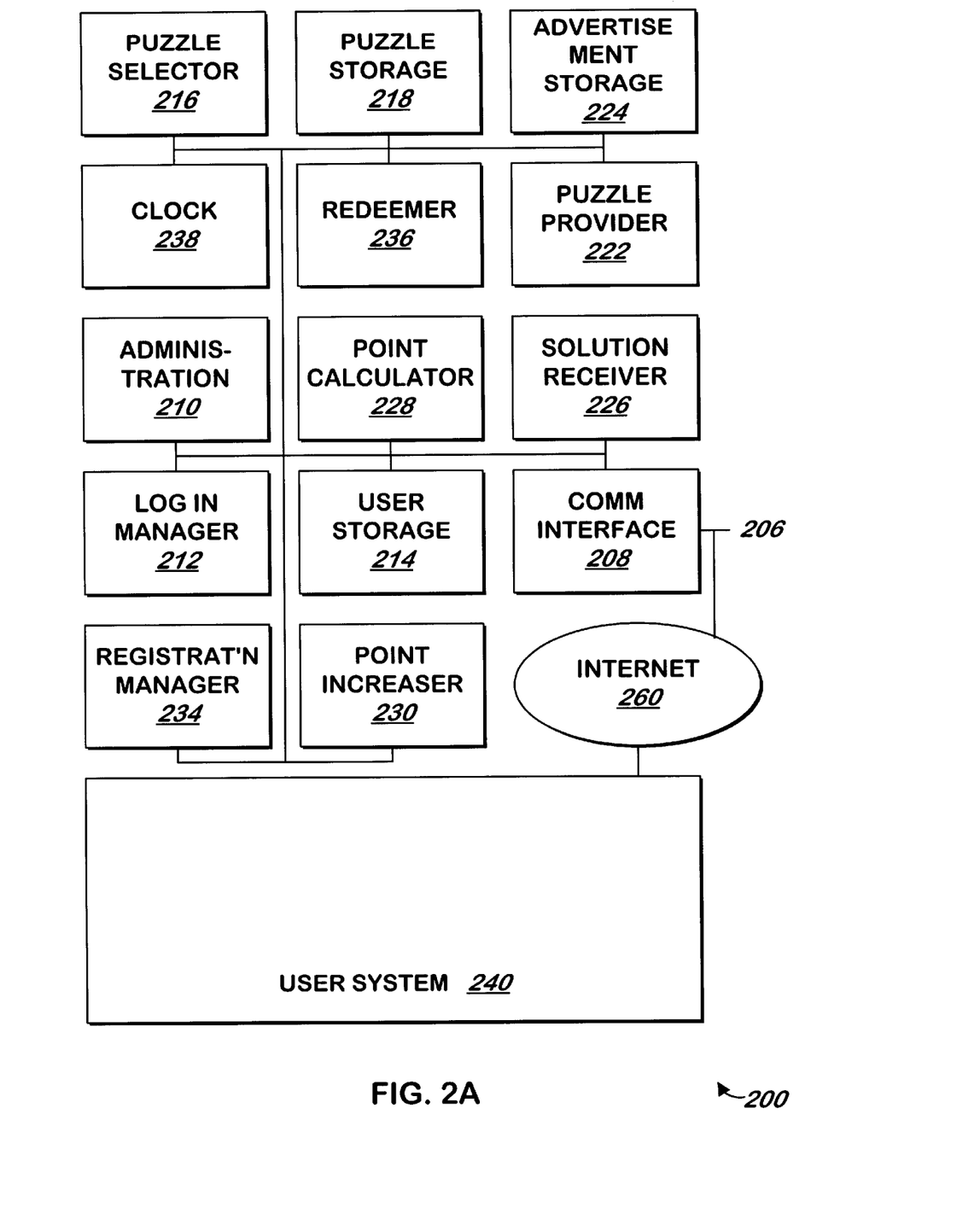
FIG. 2A is a block schematic diagram of a system for providing and scoring a puzzle according to one embodiment of the present invention.

Referring now to FIG. 2A, a system 200 for providing over the Internet and scoring a puzzle is shown according to one embodiment of the present invention. Users communicate with the system 200 using communication interface 208 via input/output 206 coupled to the Internet 260 or another communication system. In one embodiment, communication interface 208 communicates using conventional communications protocols, such as the conventional TCP/IP protocol used over the Internet 260. Although the invention is described for use in conjunction with the Internet, any Wide Area Network may be used. Communication interface 208 routes communications to or from the remainder of system 200.

A user communicates with the system 200 via the Internet 260 using a conventional computer 240 system such as one of those described above, running a conventional browser such as the conventional Communicator product commercially available from Netscape Corporation of Mountain View or the conventional Internet Explorer product commercially available from Microsoft Corporation of Redmond, Wash. or the conventional AOL client commercially available from America Online, Inc. of Dulles Va. Computer system 240 communicates using conventional computer communications products such as a modem or LAN interface.

In one embodiment, when the user requests a web page provided by system 200, administration 210 signals log in manager 212 which provides a web page containing form elements allowing the user to log into system 200. In one embodiment, the user uses the form elements to enter a username and password, and in another embodiment, conventional cookie retrieval techniques are used to identify the user to log in manager 212 such as when the user begins playing the game or when the user submits a guess as described in more detail below. Log in manager 212 compares the user identifier and password or other form of user identification it receives against a database of user identifiers and optional passwords stored in user storage 214 as described in more detail below. If log in manager 212 authenticates the user to the system 200, the user is allowed to play the game. In one embodiment, log in manager 212 provides to the user's system 240 a cookie containing an identifier of the user using the conventional set-cookie command for future identification of the user by other components of the system 200.

In one embodiment, user storage 214 may contain a conventional computer disk and a conventional database such as the Oracle 8i database product commercially available from Oracle Corporation of Redwood Shores, Calif., or the conventional Microsoft SQL Server product commercially available from Microsoft Corporation of Redmond, Wash., although other conventional database products, such as those available from Informix or IBM may be used. Information about a user is stored in a user record for that user infuser storage 214.

In one embodiment, log in manager 212 provides a link to a web page containing form elements allowing new users to register to the system. The link contains the address of a web page provided by registration manager 234. If the user clicks the link, registration manager 234 provides a web page containing form elements allowing the user to enter personal and demographic information such as name, address, social security number, marital status, etc. via conventional CGI techniques. When the user clicks a submit button, registration manager 234 enters the information into a new user record in user storage 214 and issues and provides to the user a unique identifier and password the user may use to authenticate himself to the system 200, or uses a username and password provided by the user as part of the registration process described above. In one embodiment, registration manager 234 provides a cookie to the user's system 240 using the conventional set-cookie command for future authentication and identification as if the user had logged in as described above.

In another embodiment, the authentication process described above is performed after the user has correctly solved a puzzle as described in more detail below. This allows a user who is not registered to register to the system 200 after he or she has correctly solved a puzzle.

If log in is required before the puzzle is played, and the user's log in described above is successful, or if no log in is required or if log in is required after the user correctly solves the puzzle, administration 210 signals puzzle selector 216.

Puzzle selector 216 selects a puzzle from one of several puzzles stored in puzzle storage 218. A puzzle may be selected at random or from among puzzles not already presented to the user, played by the user, or guessed at by the user, using the user's identifier if available. In one embodiment, when a puzzle is selected, an identifier of the puzzle is associated with the user's identifier in user storage 214 by puzzle selector 216 the user's identifier is available and these puzzle identifiers are compared with the puzzle selected. If a match occurs, puzzle selector 216 selects another puzzle and repeats the process until a selected puzzle does not match those recorded as having been solved or viewed by the user. This allows puzzle selector to keep from providing the same puzzle to a single user or reduce the chances of doing so.

In one embodiment, the user may select a puzzle or select a category of puzzles and the puzzle is selected from puzzles of that category as described above. In such embodiment, each puzzle may have associated in puzzle storage 218 one or more categories.and puzzle selector 216 selects the puzzle corresponding to the category selected, or if no puzzles are available in that category, from a different category.

Puzzles may be played on a web page that primarily contains the puzzle, or may be played on a web page on which the puzzle is a small part of the page. The puzzle may be operated by the party operating the web page, or the puzzle may be passed through as part of a link to a site that operates puzzles on other site's web pages. In this case, the puzzle is displayed to the user by the user's browser when the operator of a web page adds a link to the puzzle site. The puzzle selection may be part of the link that is placed on the web page, for example as part of a parameter list, such as part of a CGI "GET". This allows the operator of the web page on which the link is placed to select the category or specific puzzle.

In this manner, the puzzle may be related to the other content of the page on which the puzzle is displayed. A web site selling books could display a puzzle about authors or titles of bestsellers. A web site selling pet supplies could display a puzzle about breeds of dogs.

In one embodiment, a puzzle consists of a puzzle file containing the puzzle, a correct answer file that contains the correct answer or answers to the puzzle and may contain possible answers to use in a multiple choice selection, an identifier of the puzzle, a scoring formula for the puzzle if each puzzle is scored differently as well as other information about the puzzle such as that described herein. This information for each puzzle is stored in record in puzzle storage 218 which is similar to user storage 214 and may in fact be part of the same database and disk as user storage 214.

In one embodiment, a puzzle file consists of a representation of a puzzle object in the form of a digitized image, sound (such as the first part or all of a song), or any other sensory impression such as smell or touch. The representation of the puzzle object may be stored in the file as set of smaller portions of the representation of the puzzle object.

After puzzle selector 216 selects the puzzle as described above, puzzle selector 216 provides the puzzle identifier of the puzzle selected into the user's record in user storage 228, and requests the time from system clock 238 which may be a part of an operating system. Puzzle selector 216 inserts the time from the clock into the user's record in user storage 214, the user's identifier having been retrieved from the cookie on the user's system 240 or passed by administration to puzzle selector 216. In one embodiment, puzzle selector 216 adds a short amount of time such as a second or two to the system clock before storing it to allow for download delays. Puzzle selector 216 then signals puzzle provider 222.

Puzzle provider 222 provides the representation of the puzzle object to the user's system 240 in such a manner that a browser will display the puzzle as described in more detail below. The representation of the puzzle object is displayed to the user by adding to the display one or more portions at a time from those not already provided until all of the representation of the puzzle object is visible to the user or the user correctly identifies the puzzle object as described in more detail below.

Figure 3A:
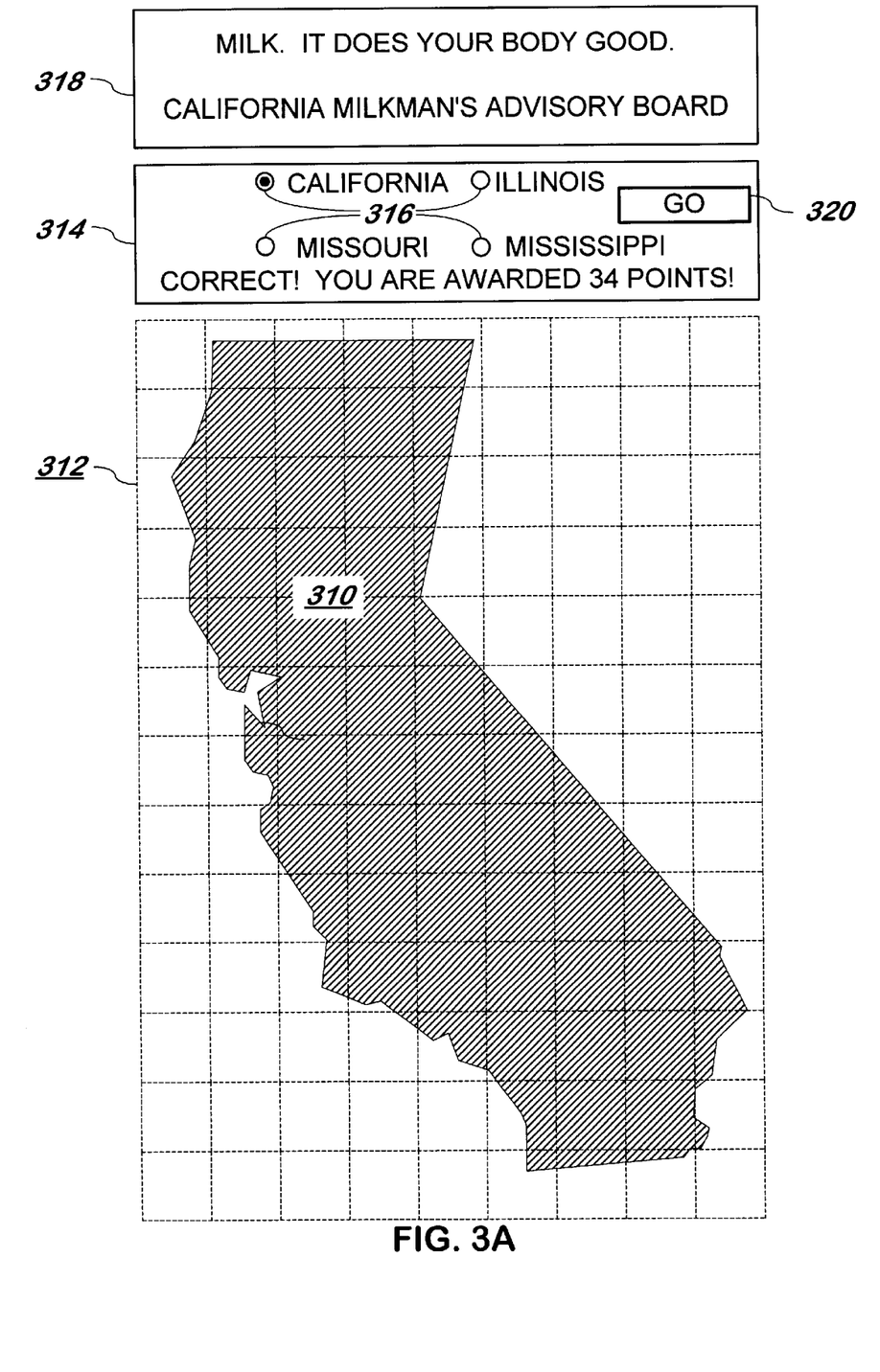
FIG. 3A is an illustration of a display of a puzzle near a banner advertisement for which the user has correctly guessed the puzzle according to one embodiment of the present invention.

Referring momentarily to FIG. 3A, the display of the representation of the puzzle object and other items is shown according to one embodiment of the present invention. The puzzle object 310 is the state of California in the United States of America. The representation of the puzzle object is a shaded graphical outline of the boundaries of the state in digital form, such as a GIF or JPEG formatted file.

The representation of the puzzle object is divided either physically or logically into many square portions as illustrated by the dashed lines 312, the display of which may be controlled so that fewer than all of the portions may be displayed at a time. The portions need not be in any particular shape and may not be contiguous. The portions need not be as large or as small as those shown: the portion may be as small as even a single pixel or as large as nearly all of the representation, as long as each portion is smaller than the entire representation. The portions need not be a uniform size.

Figure 3B:
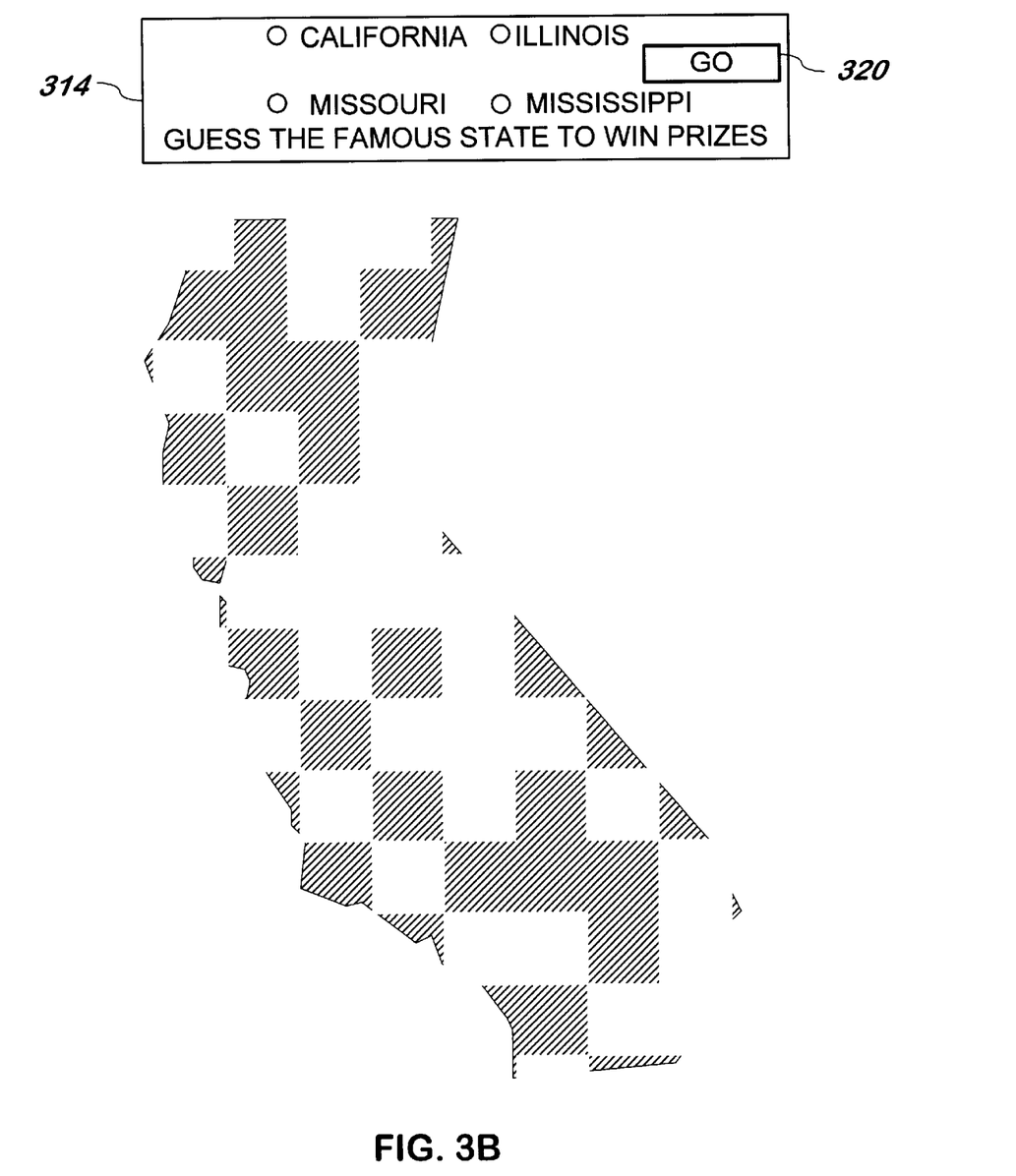
FIG. 3B is an illustration of a display of a puzzle in process according to one embodiment of the present invention.

As shown in the Figure, the entire representation of the puzzle object is visible, as would occur over time when the representation of the puzzle object is fully displayed or after a user correctly identifies the puzzle object. Initially, the representation of the puzzle object is entirely hidden from the user, and puzzle provider 222 periodically displays another one or more portions of the representation of the puzzle object until the entire representation of the puzzle object is visible as shown in the Figure. FIG. 3B illustrates how the representation of the puzzle object may be displayed after several portions have been displayed but before the user identifies the puzzle object or the entire representation is displayed.

If the puzzle object is a song or sounds, the portions may correspond to a note or portion of time of the sounds, or may correspond to individual instruments or vocals. For example, a symphony may be separated into several notes from a particular instrument and used as a portion.

Referring again to FIGS. 2A and 3A, in one embodiment, the puzzle file itself may not be actually divided into individual portions, the apportioning of the file may be done by puzzle provider 222 when it provides the puzzle file. In another embodiment, the apportioning is performed in advance and individual portions of the representation of the puzzle object are stored in the file in a manner that allows each portion to be separately identified. If the portions are so stored, they may be stored in a given order, such as left to right from top to bottom, and selected for display in a random or pseudo random order by puzzle provider 222. Alternatively, each portion may be sequentially stored in the puzzle file in random or pseudo random order along with a location identifier describing where the portion is to be displayed. When each representation of the puzzle object is provided by puzzle provider 222, it selects each portion from the puzzle file in the order in which they appear in the file and displays them according to their location identifier so that the display appears random even though the portions may be retrieved sequentially from the puzzle file.

In addition to the representation of the puzzle object, puzzle provider 222 may display one or more form elements 316 to allow the user to enter a guess to identify the puzzle object. The form elements may include radio buttons to select from among multiple choices of answers (e.g. California, Illinois, Missouri or Mississippi) or one or more text boxes to allow the user to enter one or more keywords.

In one embodiment, the representation of the puzzle object 312 may be the same as one that is used for a different set of question and answers in area 314 (for example, a different puzzle could ask, "who is the governor of the state below"). In such embodiment, the representation of the puzzle object is stored separately from the puzzle file in puzzle storage 218 and the puzzle file contains a link to the representation of the puzzle object to be used.

In one embodiment, puzzle provider 222 displays a banner or button advertisement 318 with the representation of the puzzle object. For example, the banner or button advertisement may be displayed adjacent to or nearly adjacent to the representation of the puzzle object or the form elements 316. In another embodiment, the representation of the puzzle object is part of or all of a banner or button advertisement. The advertisement may be displayed while the user is attempting to guess at the puzzle or may be displayed at another time, such as after the user attempts to identify or correctly identifies the puzzle object. For example, a correct guess of the puzzle object of FIG. 3A may cause puzzle provider 222 to display an advertisement message 318 for the California Milkman's Advisory Board above the representation of the puzzle object.

The user may attempt to solve the puzzle by entering one or more words in a text box or selecting a radio button 316 corresponding to a multiple choice answer from among the choices provided in area 314 (in addition to a question) and then pressing a submit button 320. Solution receiver 226 receives the attempted solution and investigates the user's identifier using the cookie. Solution receiver 226 uses the user's identifier from the cookie to look up in user storage 214 the puzzle identifier for the current puzzle provided to the user. In another embodiment, when the puzzle is displayed to the user, the puzzle identifier is placed into a cookie by puzzle selector 216 or puzzle provider 222 and the puzzle identifier is retrieved from the cookie by solution receiver 226. Solution receiver then looks up in puzzle storage to find one or more correct answers for the puzzle and compares the correct answer with the user's attempted solution. If there is a match or near match, solution receiver signals point calculator 228.

There are many responses possible in the event of an incorrect attempted solution of the puzzle. In one embodiment, a user only has one opportunity to solve the puzzle: any incorrect attempted solution terminates the puzzle. In such embodiment, solution receiver 226 signals puzzle provider 222 which then displays the entire representation of the puzzle object to the user and one or more of the solutions, retrieved from puzzle storage 218 (where multiple solutions are possible, one or more of the solutions considered "best" by the designer of the puzzle may be displayed or all of the solutions may be displayed.) and signals point calculator 228 with an indication to provide to the user a minimum number of points for the puzzle.

In another embodiment, a user may be allowed a limited number of solution attempts. In such embodiment, if a solution attempt is unsuccessful, solution receiver 226 notifies puzzle provider 222, which provides to the user a message informing the user that the attempted solution was incorrect. Solution receiver 226 increases a counter in the user's record in user storage to keep track of the number of unsuccessful attempts to solve the puzzle, such counter being initialized by puzzle selector 216 or puzzle provider 222 when a new puzzle is selected or display of a new puzzle is initiated. Solution receiver 226 checks the number of guesses in the counter with the maximum number allowed. The maximum number allowed may be the same number for every puzzle, in which case the number of attempted solutions is compared with a number stored internally by solution receiver 226. The maximum number allowed may depend on the puzzle and may be part of the puzzle stored in puzzle storage. Solution receiver 226 may compare the counter for the user with a maximum number of guesses allowed stored in puzzle storage associated with the puzzle identifier. If the counter equals the maximum number allowed, solution receiver 226 terminates the puzzle as described above.

If the attempted solution matches the solution for the puzzle, solution receiver 226 requests the current time from the system clock 224 and signals puzzle provider 222 with an indication that the puzzle has been solved and signals point calculator 228 with the identifiers of the user and the puzzle and the time on the system clock. Puzzle provider 222 provides to the user's system 240 for display to the user the undisplayed remainder of the puzzle file and a message that the attempted solution was correct as shown in FIG. 3A. In one embodiment, puzzle provider 222 also retrieves from point calculator 228, and provides to the user's system 240 display information containing, the number of points awarded for the solution of the puzzle, computed as described below. Puzzle provider 222 also retrieves from user storage 214 using the user identifier from the cookie the number of points (not shown) that are unredeemed by the user, and may display that figure as well.

Once the user has identified himself to the system, point calculator 228 retrieves the starting time in the user's record in-user storage 214 and calculates the points awarded for the solution of the puzzle according to the difference between the starting time it retrieves and ending time it receives from solution receiver 226 so that the points awarded will decrease from a maximum number of points for the puzzle the longer it takes the user to solve the puzzle. The decrease in value may be exponential or a straight line or any other decreasing function that is inversely proportional to the difference between the two times. In one embodiment, the maximum point value, minimum point value and decrease function are stored in the puzzle record in puzzle storage 218 and point calculator 228 retrieves them using the puzzle identifier it receives from solution receiver in order to calculate the point value. These items may be stored internally by point calculator 228 if they are the same for every puzzle. In one embodiment, point calculator 228 decreases the number of points it calculates by a number of points or a percentage of the number of points it calculates for each incorrect answer stored in the user's record in user storage 214 according to a fixed formula or a formula stored in puzzle storage 218 associated with the puzzle the user has solved. If point calculator 228 was signaled by solution receiver 226 to provide the minimum number of points, the minimum number of points is assigned by point calculator 228 instead of a calculated number of points.

Point calculator 228 uses the user identifier it receives from solution receiver to add to a "total points" field in the user's record in user storage 214 the number of points it calculates. The total points field is initialized to zero by registration manager 234 which the user registers to the system, and may be reduced by redeemer as described below.

If the user does not have to identify himself to receive the puzzle as described above, if the user correctly solves the puzzle, the user is prompted to identify himself using a username or password or click on the link to register before the points can be added to the user's record in user storage 214 and display of unredeemed points is made. In such embodiment, point calculator 228 provides the number of points awarded to a temporary user identifier that it stores as a cookie on the user's system 240 and enters into user storage 214 as part of a record for the temporary user identifier. When the user submits his registration or user identifier, the temporary user identifier is retrieved from the cookie and used to match the points awarded to the user's actual user identifier and these points are added to the user's total points by point calculator 228.

If the puzzle, is not solved after the entire representation of the puzzle object is displayed, the representation of the puzzle object may remain on the screen for a period of time, at which point the user may be awarded zero points or a nominal amount of points for playing the game. In such embodiment, after the entire puzzle object is displayed and an additional period of time elapses, puzzle provider 222 signals point calculator 228 and indicates that the puzzle has not been solved. Point calculator 228 adds the minimum number of points to the user's total points field in the user's record.

If the user solves the puzzle or the puzzle is not solved or the user runs out of permitted attempts to solve the puzzle, puzzle provider 222 signals puzzle selector 216, which selects a new puzzle and repeats the procedure described above.

In one embodiment, before a new puzzle is selected, an additional question is posed to the user by puzzle provider 222. The additional question may be a question related to the puzzle, or an advertisement displayed with the puzzle. The user is allowed to attempt to solve the question for additional points as described above.

In one embodiment, the puzzle, the advertisement or both contains a link to a web page of an advertiser or a separate link is displayed by puzzle provider 228. For example, if the user clicks on the advertisement 318 of FIG. 3, the user's browser will request and display a home page of the California Milkman's Advisory Board. In addition, system 200 will enhance the point value of the puzzle related to the advertisement or a different puzzle when the user clicks the advertisement. The different puzzle could be a puzzle displayed on the page displayed when the user clicks the link, so that if the user correctly solves a puzzle on that page, the point value of the second puzzle is enhanced by clicking through the first puzzle or advertisement near the first puzzle.

In one embodiment, the link for the advertisement is set up to provide to point increaser 234 the user identifier of the user who has clicked through and the puzzle identifier of the puzzle. This may be accomplished using any of a variety of methods. In one embodiment, the link starts a Javascript applet that is provided to the user's browser by puzzle provider 222 before, or with, the puzzle. The Javascript applet contains the user identifier and the puzzle identifier and sends these identifiers to point increaser 230 using conventional CGI techniques (e.g. using the conventional form.submit( ) command, or form.button.click( ) command), then redirects the user to the website related to the advertisement, for example using window.location="http://www.MMAB.com" (if MMAB is the desired homepage). Although Javascript and CGI are described above, any conventional language or protocol may be used.

In another embodiment, the click through link contains the identifiers as input parameters or are otherwise embedded in the URL of the link that cause the server that provides the destination page of the link to provide the parameters to point increaser 230 when the destination page of the link is created.

Point increaser 230 receives the identifiers described above and retrieves an enhancement value from the puzzle record in puzzle storage 218 or uses an internally stored value. The enhancement value may be a point value or may be a percentage of the point value awarded to the user for correctly identifying the puzzle object. In such embodiment, point calculator 228 not only accumulates the point value into the total points field as described above, but also stores the point value and puzzle identifier in the user's record in user storage 214. Point increaser 230 uses this information to enhance the point value. If the puzzle was not solved, the puzzle identifier stored in the user's record will not match the puzzle identifier received by point increaser 230 and point increaser 230 will not add any points to the user's total point field. If there is a match, point increaser 230 adds to the user's total points field an amount equal to the amount retrieved from puzzle storage or an amount equal to the score for the puzzle multiplied by the percentage retrieved from puzzle storage 218.

In one embodiment, if the puzzle has not been solved, when the user clicks the link, point increaser 230 requests the time from clock 238, records the time in the user record in user storage 214, and signals puzzle provider, which notes the state of the display of the puzzle and stores it in the user's record in user storage 214. The next time a puzzle is to be selected, such as when the user returns to the page that originally displayed it, puzzle provider 222 requests the time from clock 238 subtracts the difference between the former starting time and ending time, subtracts this value from the current time and records the result as the time the user started the puzzle in the user's record in user storage 214. Puzzle provider 222 uses the state information in the user's record in user storage 214 to reproduce the state of the puzzle when the user clicked the link and then continues providing for display the portions of the representation of the puzzle object from this state. In this manner, the user can continue where the user left off if the user clicks through an advertisement or other link and then returns to a page that displays the representation of the puzzle object.

If the user wishes to redeem the total points, the user may log into a home page using log in manager 212 as described above. After the user is authenticated, log in manager signals redeemer 236, which provides the user a web page with various links to redeem his or her total points. If the user clicks on a "check request" link, redeemer 236 prints a check which is mailed to the user. If the user clicks on a credit an account link, a credit card or bank account is credited, either by using account information requested from the user at the time of redemption or at the time of registration by registration manager 234. If the user clicks a discount link, redeemer 236 provides a discount code. The discount code may be entered into a retailer's website to obtain a discount. Redeemer 236 subtracts some or all of the user's total points in response to the link selected and the number of points redeemed. In one embodiment, redeemer 236 retrieves from user storage 214 the total points of the user and only provides as links a description of each redeemable award and the point value of the award for which the user total points qualifies. Descriptions and point values for other awards are provided without a link to allow the user to view other awards available for additional points.

In one embodiment, some points may be redeemed only as a discount on certain sites. For example, points earned by correctly solving puzzles at a certain retailer's site may only be redeemed at that site. In another embodiment, the correct solution for each puzzle is awarded such site-specific points as well as general points that may be redeemed at any site or for cash or check or credits against a credit card or other financial institution account.

Figure 6:
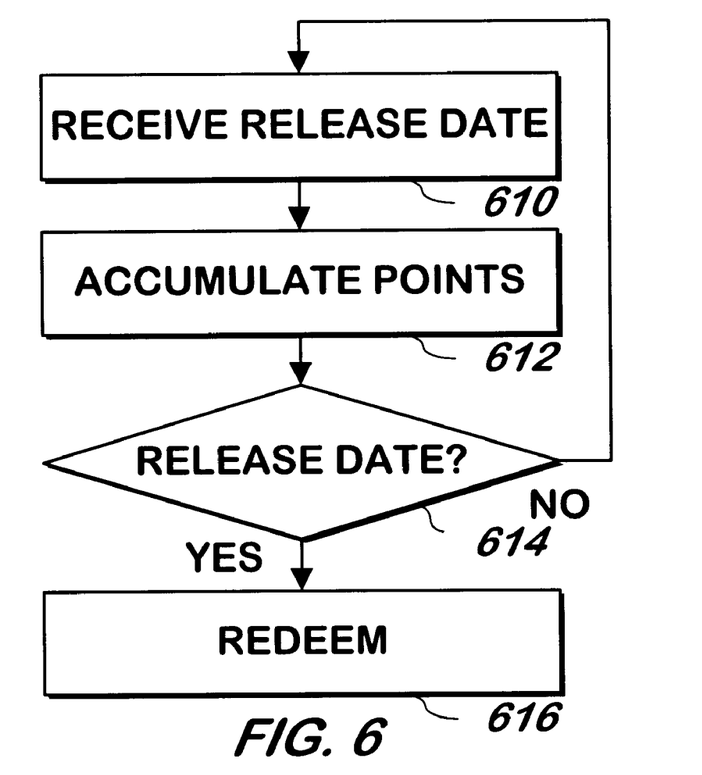
FIG. 6 is a flowchart illustrating a method of automatically redeeming points accumulated by solving one or more puzzles over the Internet according to one embodiment of the present invention.

In one embodiment, redeemer 236 and registration manager 234 work together to allow a user to set up a trigger date to automatically redeem a user's points for cash or other prizes as described in FIG. 6. Referring now to FIG. 2A and 6, a method of automatically redeeming points accumulated by solving one or more puzzles over the Internet is shown according to one embodiment of the present invention. A user may use registration manager 234 to identify a date on or near which they would like their points to be redeemed as described above and the date is received 610 and stored in the user's record in user storage 214 by registration manager 234. The date may correspond to an occasion, such as an anniversary, birthday, holiday or any other date. The user may specify how the points are to be redeemed (e.g. cash, check, discount, etc.) as part of step 610 and this information is also stored in the user's record in user storage 214.

Points are accumulated 612 by solving or viewing puzzles as described above in one embodiment. In another embodiment, points are accumulated by purchasing products or services, for example from a retailer, which may be a website remote from the system 200. In one embodiment, points are expressed in dollars and cents or dollars and cents may be used instead of points. In one embodiment, before a user purchases a product or service from a retailer, the retailer informs the user an amount that is approximately equal the amount the user will save by purchasing or otherwise paying for the product or service from that retailer (as compared to a list price or any of several other prices), or allows the user to enter this figure. The user may then pay the retailer the amount it charges for the product or service, plus the amount of the savings. This allows the user to identify the amount of money he or she has saved by shopping online and then place an amount of money corresponding to that amount into an account for release at a later time.

The retailer then transmits the identifier of the user, an identifier of the retailer and the amount of the difference or an amount that is nearly that amount to point calculator 228 via communication interface 208 and the Internet 260 or any other means of communication such as the telephone. The amount of the savings is then credited to the user as points. This allows a user to pay the higher amount, yet be credited for the difference. Point calculator 228, which adds that many points (or nearly that many points) to the user's record in user storage 214 and also increments an amount owed field in a retailer record in user storage 214 by that difference or nearly that difference.

Redeemer 236 retrieves the date from clock 238 and checks each record in user storage 214 for that date. When the date identified in step 610 above arrives (or is near the date identified in step 610, such as a few days before) 614, redeemer 236 redeems the points, for example by printing a check and sending it to the user, crediting a bank account or credit card or other financial account.

In one embodiment, interest is added to the points or dollars redeemed as part of step 616 or 612. In one embodiment, funds are provided as part of step 616 only if they exceed a threshold, such as $50. In another embodiment, interest is not added. In one embodiment, funds are provided as part of step 616 only if they have been held for a period of time such as a period during which sufficient interest on the funds have accrued to pay some or all of the cost of administration, such as the credit card fee for the funds that were charged to a credit card when a product or service was purchased as described above. The holding requirement may be applied to each set of funds received according to the date it was received or to an average. In one embodiment, the holding requirement is enforced only by requiring the user to set a release date for the funds a certain amount of time in the future, such as six or nine months.

If the points were accumulated as a result of a purchase of a product or service, the amount owed field is periodically charged to the retailer or funds are received from that retailer in approximately that amount by redeemer 236, which then credits the amount received against the amount owed by that retailer. In one embodiment, some or all of the costs incurred by the retailer are offset against the amount owed by the retailer, such as additional credit card charges the retailer will owe as a result of the additional amount (beyond its regular price) it collects as described above.

It may be desirable to have some or all of system 200 located on the user's computer system. For example, puzzle provider 222 may be located on the user's computer system to reduce the delay associated with sending information back and forth over the Internet 260.

Figure 2B:
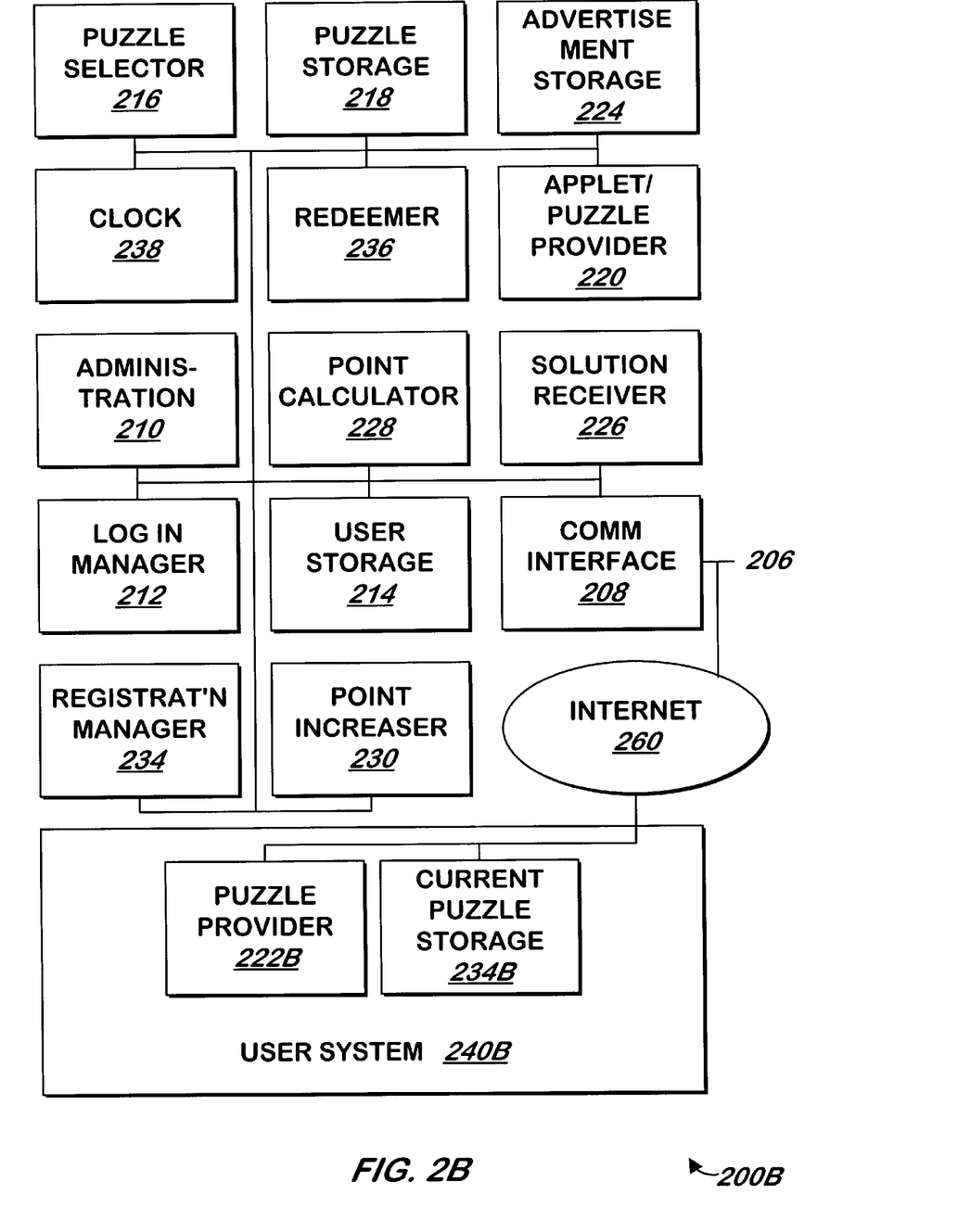
FIG. 2B is a block schematic diagram of a system for providing and scoring a game according to an alternate embodiment of the present invention.

In one embodiment, instead of signaling puzzle provider to provide the representation of the puzzle object as described above, administration 210 causes a Java or Javascript applet to be downloaded to the user's computer system 240 that can accept the puzzle file and provide the successive portions of the representation of the puzzle object. Referring now to FIG. 2B, the system 200B of the present invention is shown according to another embodiment of the present invention. The system 200B operates as the system 200 of FIG. 2A except as set forth herein. Puzzle selector 216 signals applet/puzzle provider 220 with the identifier of the puzzle it selects as described above. Applet/puzzle provider 220 downloads to the user's computer system 240 to current puzzle storage 234B, some or all of the puzzle (for example, the puzzle file) selected by puzzle selector 216. The file may be encrypted or otherwise encoded using any conventional technique to prevent or inhibit a user from displaying the entire puzzle more rapidly than the portion at a time that is performed by system 200B. Applet/puzzle provider 220 also downloads puzzle provider 222B.

Puzzle provider 222B operates as puzzle provider 222 of FIG. 2A except that it retrieves portions of the puzzle from current puzzle storage 234B instead of puzzle storage 218. In this manner, the puzzle is downloaded and displayed to the user from the user's system, preventing network delays from increasing the time it takes to display the puzzle.

Figures 4, 5:
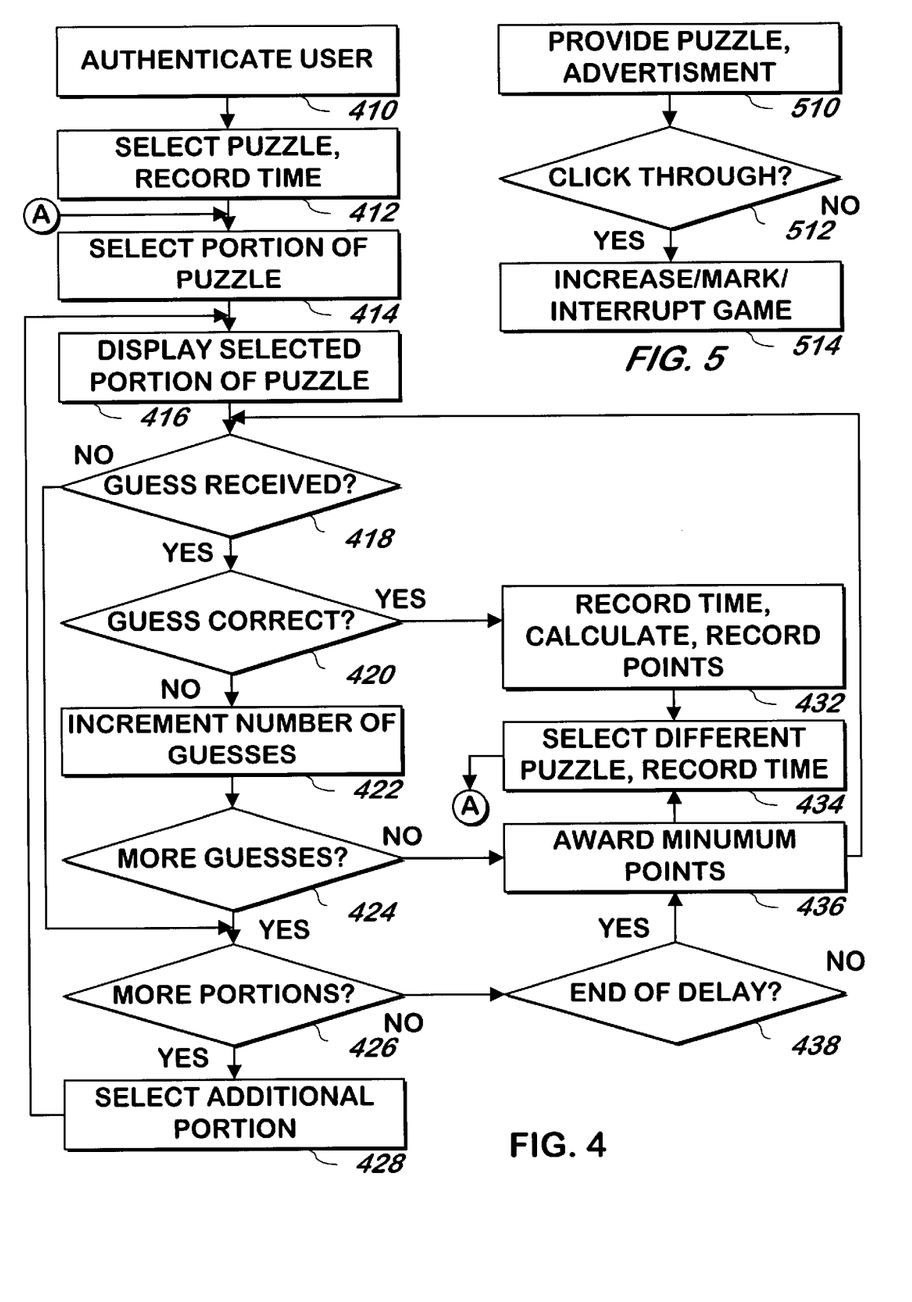
FIG. 4 is a flowchart illustrating a method of providing and scoring a puzzle according to one embodiment of the present invention.
FIG. 5 is a flowchart illustrating a method of enhancing a score of a puzzle due to a user's click through of an Internet advertisement or link according to one embodiment of the present invention.

Referring now to FIG. 4, a method of providing a timed puzzle to a user and calculating a score is shown according to one embodiment of the present invention. A user is authenticated 410 as described above, having registered as described above. A puzzle is selected 412 as described above, and the time is recorded as described above.

A portion of the puzzle is selected 414 and the selected portion is provided and displayed 416 to the user. If an attempt to solve the puzzle is received 418, if the attempted solution is correct 420, the time is recorded and points for the user are calculated 432, recorded and added to a total number of points for the user as described above and the method continues at step 434. The points are capable of being redeemed as described above. If no attempt is made to solve the puzzle 416, the method continues at step 426.

If the attempted solution is incorrect 420, a number of incorrect attempts is incremented and if the number of allowed guesses for the puzzle is exhausted, a minimum number of points is awarded 436 as described above and the method continues at step 434. Otherwise 424, the method continues at step 426.

At step 426, if there are more portions of the puzzle that have not been displayed 426, an additional portion of the puzzle not already displayed is selected 428 and the method continues at step 416 so that all portions of the puzzle that have been selected are concurrently displayed. In another embodiment, as one or more portions are selected or newly displayed, one or more portions already displayed are erased from the display, similar to the game of "concentration". In one embodiment, step 428 includes a delay so that the difference in time between each iteration of step 416 is a constant or near constant period.

At step 434, a different puzzle is selected and the starting time for the different puzzle is recorded and the method continues at step 414.

Referring now to FIG. 5, a method of enhancing a score responsive to a click through of an advertisement or link is shown according to one embodiment of the present invention. A puzzle and an advertisement or link are provided 510 as described above. The advertisement or link may be displayed near a puzzle or be a part of the puzzle as described above. If the user clicks or otherwise interacts with the advertisement or link, 510, the score is increased or marked for increase 514 if the puzzle is solved as described above 512. The puzzle may be interrupted as part of step 514 as described above.

In one embodiment, the invention above may be implemented as part of any conventional website. The website in one embodiment may contain a list of world, national or local records having to do with the Internet. For example, the site may list sites with the largest or smallest: number of individual pages, number of users, number of unique visitors, number of daily page hits. The site may list one or more sites with the: fastest response time, slowest response time, most number of products to be sold, highest dollar volume of products sold in a month, most banner or button advertisements, widest product selection, most links to other sites and most linked from other sites, most number of pages inventoried for searches, most relevant search results returned, most number of words on the entire site, largest number of graphics bits, most number of words on a single page, longest running website, receiving the most print, fastest to reach a certain number of hits per day or month after launch, greatest number of users in a demographic group, widest number of demographic groups over a certain number per group, stickiest site (longest average time users spend on the site), highest number of repeat visitors, average repeat visitors repeat the highest number of times. The site may list users with the longest continuous surfing session, longest chat session, most number of pages viewed, most number of sites viewed, highest dollar amount of products ordered online. The records may be published in print form. Users may nominate sites for consideration. Categories may be arranged in advance for sites or users to compete against one another. Prizes may be awarded or donated to charity for winning or losing a particular category.

What is claimed is:

1. A method of providing to a user and scoring a puzzle, the method comprising:

providing at least one portion of a representation of a puzzle object having at least one actual solution;

automatically and without requiring user input, successively providing over a period of time each of a plurality of portions of the representation of the puzzle object having at least one actual solution;

receiving at a first time an attempted solution describing the puzzle object; and providing a score responsive to at least one selected from the at least one actual solution corresponding to the attempted solution and the first time.

2. The method of claim 1 wherein the score is inversely proportional to the first time and a second time, earlier than the first time.

3. The method of claim 2 wherein the second time corresponds to a time a first at least one of the portions is provided.

4. The method of claim 1 wherein the representation of the puzzle object comprises at least one image.

5. The method of claim 1 wherein the representation of the puzzle object comprises at least one sound.

6. The method of claim 1, wherein at least one selected from:

the representation of the puzzle object is displayed near at least one selected from a first advertisement and a link; and the representation of the puzzle object is a second advertisement.

7. The method of claim 6 comprising an additional step of providing an additional score responsive to a user interacting with at least one selected from the link, the first advertisement and the second advertisement.

8. The method of claim 1 wherein the plurality of portions are provided using an Internet.

9. The method of claim 1 additionally comprising providing an award responsive to the score.

10. The method of claim 9 additionally comprising providing the award additionally responsive to at least one other score.

11. The method of claim 1 wherein the award is provided at least near a prearranged date.

12. A computer program product comprising a computer useable medium having computer readable program code embodied therein for providing to a user and scoring a puzzle, the computer program product comprising:

computer readable program code devices configured to cause a computer to provide at least one portion of a representation of a puzzle object having at least one actual solution;

computer readable program code devices configured to cause a computer to, automatically and without requiring user input, successively provide over a period of time each of a plurality of portions of the representation of the puzzle object having at least one actual solution;

computer readable program code devices configured to cause a computer to receive at a first time an attempted solution describing the puzzle object; and computer readable program code devices configured to cause a computer to provide a score responsive to at least one selected from the at least one actual solution corresponding to the attempted solution and the first time.

13. The computer program product of claim 12 wherein the score is inversely proportional to the first time and a second time, earlier than the first time.

14. The computer program product of claim 13 wherein the second time corresponds to a time a first at least one of the portions is provided.

15. The computer program product of claim 12 wherein the representation of the puzzle object comprises at least one image.

16. The computer program product of claim 12 wherein the representation of the puzzle object comprises at least one sound.

17. The computer program product of claim 12, wherein at least one selected from:

the representation of the puzzle object is displayed near at least one selected from a first advertisement and a link; and the representation of the puzzle object is a second advertisement.

18. The computer program product of claim 17 additionally comprising computer readable program code devices configured to cause a computer to provide an additional score responsive to a user interacting with at least one selected from the link, the first advertisement and the second advertisement.

19. The computer program product of claim 12 wherein the plurality of portions are provided using an Internet.

20. The computer program product of claim 12 additionally comprising computer readable program code devices configured to cause a computer to provide an award responsive to the score.

21. The computer program product of claim 20 additionally comprising computer readable program code devices configured to cause a computer to provide the award additionally responsive to at least one other score.

22. The computer program product of claim 12 wherein the award is provided at least near a prearranged date.

23. A system for providing to a user and scoring a puzzle, the system comprising:

a puzzle displayer for providing at an output at least one portion of a representation of a puzzle object having at least one actual solution, and for automatically and without requiring user input, successively providing at the output each of a plurality of portions of the representation of the puzzle object having an actual solution over a period of time;

a solution receiver for receiving from a user at an input at a first time an attempted solution describing the puzzle object, and for providing the attempted solution and an indication of the first time at an output; and a point calculator having a first input coupled to the solution receiver output for receiving the solution and indication of the first time, and a second input operatively coupled for receiving an actual solution for the puzzle.object, the point calculator for calculating and providing at an output a score responsive to at least one selected from the at least one actual solution corresponding to the attempted solution and the indication of the first time.

24. The system of claim 23 wherein the solution receiver additionally comprises a third input operatively coupled for receiving an indication of a second time, earlier than the first time, and the solution receiver calculates the score additionally responsive to the indication of the second time.

25. The system of claim 24 wherein the second time corresponds to a time a first at least one of the portions is provided by the puzzle provider.

26. The system of claim 23 wherein the representation of the puzzle object comprises an image.

27. The system of claim 23 wherein the representation of the puzzle object comprises at least one sound.

28. The system of claim 23 wherein at least one selected from:

the puzzle displayer displays the representation near one selected from a first advertisement and a link; and the representation comprises a second advertisement.

29. The system of claim 28, additionally comprising a point increaser coupled to the at least one selected from the advertisement and the link, the point increaser for providing an additional score responsive to a user interacting with at least one selected from the link, the first advertisement and the second advertisement.

30. The system of claim 23 wherein the puzzle displayer output and the solution receiver input are coupled to an Internet.

31. The system of claim 23 additionally comprising a redeemer having an input coupled to the point calculator output, the redeemer for providing at an output an award responsive to the score.

32. The system of claim 31 wherein the redeemer provides the award responsive to an additional score.

33. The system of claim 31 wherein the redeemer additionally comprises a first date input operatively coupled for receiving a desired redeem date and a second date input operatively coupled for receiving a current date, and the redeemer provides the award additionally responsive to the desired redeem date received at the first redeemer date input is at least near the current date received at the second redeemer date input.

* * * * *

UNITED STATES PATENT AND TRADEMARK OFFICE
CERTIFICATE OF CORRECTION

PATENT NO.    : 6,790,138 B1
DATED         : September 14, 2004
INVENTOR(S)   : Erlichman It is certified that error appears in the above-identified patent and that said Letters Patent is hereby corrected as shown below:

Title page,
Item [74], *Attorney, Agent, or Firm*, delete "Innovative" and insert in place thereof -- Innovation --.

Column 3,
Line 58, delete "infuser" and insert in place thereof -- in user --.

Column 4,
Line 29, delete "216" and insert in place thereof -- 226 --.

Column 6,
Line 31, add a -- ? -- after the word "below".

Column 7,
Line 67, delete the """ (quotation mark) in between the words "them" and "using".

Signed and Sealed this

Twenty-sixth Day of October, 2004

JON W. DUDAS
*Director of the United States Patent and Trademark Office*